United States Patent

Hatori et al.

[11] Patent Number: 5,561,549
[45] Date of Patent: Oct. 1, 1996

[54] OPTICAL ELEMENT

[75] Inventors: Masami Hatori; Kiichi Kato, both of Kanagawa-ken, Japan

[73] Assignee: Fuji Photo Film Co. Ltd., Kanagawa, Japan

[21] Appl. No.: 352,563

[22] Filed: Dec. 9, 1994

[30] Foreign Application Priority Data

Dec. 10, 1993 [JP] Japan .................... 5-310129

[51] Int. Cl.$^6$ ................................ G02F 1/29
[52] U.S. Cl. .................. 359/319; 359/315; 359/249; 359/298
[58] Field of Search .................. 359/319, 301, 359/245, 246, 315, 249, 298

[56] References Cited

U.S. PATENT DOCUMENTS

| | | | |
|---|---|---|---|
| 3,626,511 | 12/1971 | Hammer | 359/315 |
| 4,066,338 | 1/1978 | Hattori et al. | 359/315 |
| 4,243,300 | 1/1981 | Richards et al. | 359/315 |
| 4,343,536 | 8/1982 | Watanabe et al. | 359/315 |
| 4,866,406 | 9/1989 | Minakata et al. | 359/315 |
| 4,976,517 | 12/1990 | Kozuka et al. | 359/249 |
| 5,035,495 | 7/1991 | Toyoda et al. | 359/249 |

OTHER PUBLICATIONS

A. M. Glass, "The Photorefractive Effect", Optical Engineering, vol. 17, No. 6, pp. 470–479, Sep.–Oct. 1978.
D. A. Bryan et al., "Increased Optical Damage Resistance in Lithium Niobate", App. Phys. Lett., vol. 44, No. 9, 1 May 1984, pp. 847–848.
Garrison, et al., "Microscopic Model for the Ablative Photodecompsoition of Polymers by Far–ultraviolet Radiation", Appl. Phys. Lett., vol. 44, No. 9, 1 May 1984, pp. 849.

The Japan Society of Applied Physics and Related Societies, 39th Spring Meeting, 1992, 30p–G–12, "Photorefractive Effect of Proton–Exchanged LN and MgO–Doped LN Optical Waveguides".

*Primary Examiner*—Loha Ben
*Attorney, Agent, or Firm*—Sughrue, Mion, Zinn, Macpeak & Seas

[57] ABSTRACT

An optical element consists of an LN or LT crystal doped with MgO or ZnO. A +z surface and a −z surface of the crystal are connected to each other by means of a metal jig and an indium sheet. The +z surface and the −z surface may also be connected to each other by means of an electrically conductive wire material. The optical element may be a bulk crystal, an optical waveguide type electro-optical modulator, or a bifurcated interference type optical modulator. In this way, an optical damage resistant property of the optical element is improved.

11 Claims, 3 Drawing Sheets

5,561,549

OPTICAL ELEMENT

BACKGROUND OF THE INVENTION

1. Field of the Invention

This invention relates to an optical element consisting of a LiNbO$_3$ or a LiTaO$_3$ crystal doped with MgO or ZnO, and more particularly to an optical element having an improved optical damage resistant property.

2. Description of the Prior Art

Conventionally, LiNbO$_3$ (Lithium Niobate, hereinafter referred to as LN) and LiTaO$_3$ (Lithium Tantalate, hereinafter referred to as LT) are widely known as materials having an electro-optical effect or an acoustic-optical effect or as materials having a non-linear optical effect.

These LN and LT crystals are susceptible to a phenomenon in which irradiated light induces localized variations in refractive index, that is, optical damage. This optical damage becomes maximum when a linearly polarized beam enters while the direction of polarization of the polarized beam is coincident with the direction of the z axis of the crystal, whereby the incident beam becomes considerably fuzzy in the direction of the z axis. Even when the direction of the linearly polarized beams is not coincident with the direction of the z axis of the crystal, there are components of the linearly polarized beam in the direction of the z axis, and the crystal is prone to optical damage.

Conventionally, to increase the resistance to the optical damage, the doping of the LN or LT crystal with MgO or ZnO is widely practiced. For example, in the case of the LN crystal doped with MgO, it is said that the incident beam does not become fuzzy even when a laser beam having a wavelength of 515 nm and a power of several tens of milliwatts, which is output from an Argon laser, is incident on the LN crystal.

However, when the measurement of variations in refractive index is practically carried out with respect to a number of crystals, there are some crystals in which no optical damage occurs with an optical beam having a high output power of several tens of milliwatts, but the beam becomes fuzzy only with a relatively weak optical beam having an output power of several milliwatts or thereabouts, except for the crystals which are not susceptible to optical damage in the same manner as in the conventional crystal. This phenomenon, which the present inventor has observed, is completely reverse to the phenomenon which is conventionally known.

As with this result of observation, some reports suggest that the LN crystal doped with MgO is not necessarily resistant to optical damage. Specifically, it is reported in proceedings of the Applied Physics Association in spring, 1992, 30p-G-12 that the LN crystal doped with MgO and the LN crystal which is not doped with MgO have substantially the same optical damage resistant property.

The phenomenon of optical damage ascertained through the previously mentioned observation is observed only in the LN or LT crystal doped with MgO or ZnO, and such a phenomenon is not observed in non-doped crystals. Contrary to this, the phenomenon of optical damage which has been conventionally ascertained is naturally observed, even in non-doped crystals. The more the beam becomes fuzzy, the larger the optical power becomes. Therefore, the characteristics of the phenomena are different from each other. However, the phenomenon, in which a beam becomes fuzzy, is completely indistinguishable from that caused by conventional optical damage. Accordingly, this phenomenon is defined as optical damage throughout this specification, and it will be explained hereinbelow.

SUMMARY OF THE INVENTION

The present invention is made in view of the above description, and the object of this invention is to ensure the improvement of optical damage resistant property of an optical element consisting of an LN or LT crystal doped with MgO or ZnO.

To this end, according to one aspect of this invention, there is provided an optical element comprising:

LN or LT crystal doped with MgO or ZnO on which light is incident, wherein a +z surface and a -z surface of the crystal are connected to each other by an electrically conductive material.

The optical damage resistant property of the crystal is certainly improved when the crystal, in which the +z surface and the -z surface of the crystal are connected to each other by a conductive material, and the crystal, in which the +z surface and -z surface are not connected to each other, are compared with each other. Thus, the fuzziness of an incident beam occurring when a light beam is incident on the crystal is evidently reduced.

DETAILED DESCRIPTION OF THE PREFERRED EMBODIMENTS

The present invention will be described in detail hereinbelow on the basis of embodiments illustrated in the accompanying drawings.

First Embodiment

Figures 1, 2:
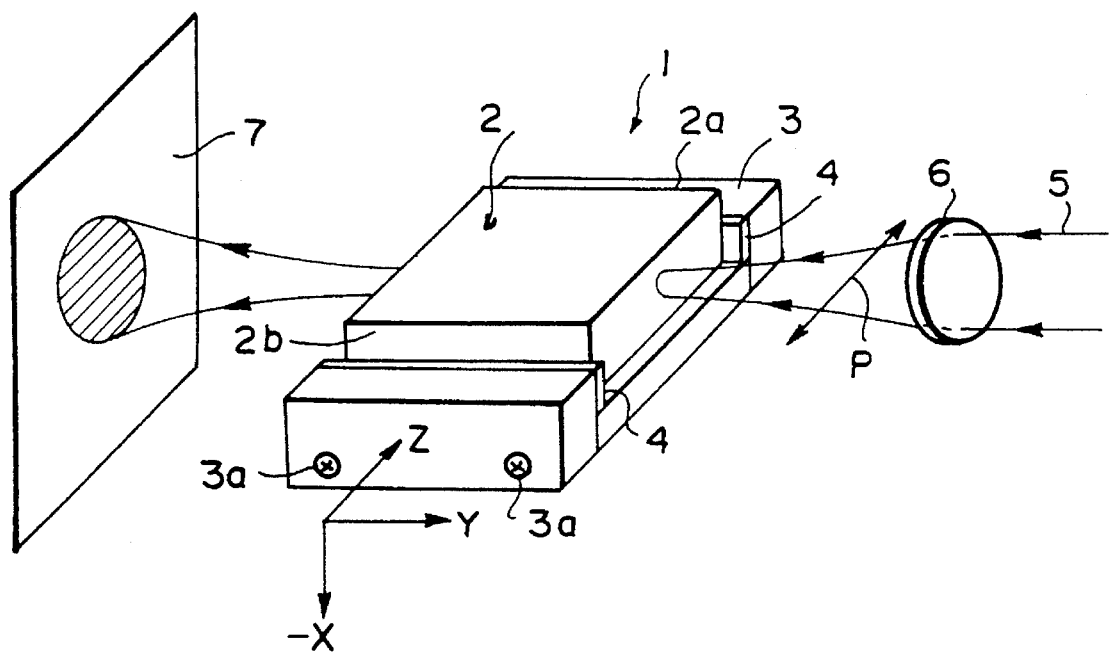
FIG. 1 is a perspective view showing a first embodiment of an optical element according to this invention.
FIG. 2 is a schematic representation showing the cross-sectional views of a light beam having passed through the optical element, shown in FIG. 1, and a conventional optical element in such a way that the cross-sectional views are compared with each other.

FIG. 1 shows a first embodiment of an optical element according to the present invention. An optical element 1 of this first embodiment is a bulk crystal type. This optical element 1 is composed of an LN crystal 2 doped with MgO (hereinafter referred to as MgO-LN), and a metal jig 3 which holds the MgO-LN crystal 2 at a +z surface 2a and a -z surface 2b thereof. The MgO-LN crystal 2 is doped with, for example, 5% MgO, and is cut along the x axis. This MgO-LN crystal 2 is subjected to ordinary proton exchange and annealing treatment. On the other hand, the metal jig 3 is made up of three small pieces which are made of conductive material such as aluminum and are arranged into a pattern having a C-shaped cross section using four machine screws 3a (only two of them provided on one side of the jig are shown in the drawing).

When the metal jig 3 is assembled in the manner as previously mentioned, the MgO-LN crystal 2 is sandwiched and held in this metal jig 3. To prevent the crystal from fracturing when the machine screw 3a is fastened, an indium sheet 4, which is an electrically conductive soft material, is sandwiched between the +z surface 2a and the metal jig 3 and between the −z surface 2b and the metal jig 3. Accordingly, the +z surface 2a and the −z surface 2b of the MgO-LN crystal 2 are connected to each other by means of the indium sheet 4 and the metal jig 3.

A linearly polarized laser beam 5 which is emitted from an Argon laser is incident on the MgO-LN crystal 2 having the previously mentioned structure after the beam has been focused onto the MgO-LN crystal 2 using a condenser lens 6 having a focal length of 60 mm. At this time, the direction of a polarized beam designated by an arrow P is made to be coincident with the direction of the z axis. The laser beam 5 which has passed through the MgO-LN crystal 2 is irradiated onto a screen 7, and a cross-sectional form of the beam is examined. Before the MgO-LN crystal 2 is held by the metal jig 3, the cross-sectional form of the laser beam 5, which has passed through the crystal 2 in the same manner as previously mentioned, is examined as a comparative example. An output of the laser beam 5 is set to three strengths, i.e. 1 mW, 3 mW and 10 mW. In any case, the cross-sectional form of the beam is examined. The crystal used in this example is doped with 5% MgO, and it is ascertained in any case that the ratio of the MgO is equal as a result of component analysis.

FIG. 2 shows cross-sectional forms of the laser beam 5 examined in this manner. When the output of the laser beam 5 is set to 10 mW, the cross-sectional forms of the laser beam 5 are close to a perfect circle in either the embodiment or the comparative example, and hence it can be deemed that no optical damage occurs. The result in this case is the same as that conventionally known.

When the output of the laser beam 5 is set to 3 mW, in the comparative examples, some crystals produce a laser beam having a cross-sectional form close to a perfect circle, and no optical damage occurs. However, the other crystals produce a laser beam having a cross-sectional form with fluctuation in the direction of the z axis (in a vertical direction in the drawing). Thus, optical damage occurs. However, even when the output of the laser beam 5 is set to 3 mW, in the case of the optical element according to this embodiment, the crystal suffering from optical damage produces a laser beam having a cross-sectional form close to a perfect circle. Resistance to optical damage is evidently improved when compared with the comparative examples.

When the output of the laser beam 5 is set to 1 mW, some crystals of the comparative examples produce a laser beam having a cross-sectional form close to a perfect circle. However, in many cases, the crystal produces a laser beam having a cross-sectional form with fluctuation in the direction of the z axis or a laser beam having an oval cross-sectional form which is extended in the direction of the z axis. Hence, it can be deemed that optical damage occurs. Contrary to this, in the case of the optical element 5, when the output of the laser beam 5 is set to 1 mW, and when the crystal 2 is moved in the direction of the z axis while the laser beam 5 is being incident on the crystal 2, some disorder in the laser beam is observed in a part of the crystal. When the crystal 2 remains fixed (this is an ordinary working condition), the cross-sectional form of the beam is close to a perfect circle. The optical damage resistant property is evidently improved when compared with the comparative examples.

The previously mentioned MgO-LN crystal 2 is subjected to proton exchange and annealing treatment. However, the present invention is applicable to MgO-LN crystals which are not subjected to these treatments, and the same effects as previously mentioned are obtained.

Second Embodiment

Figure 3:
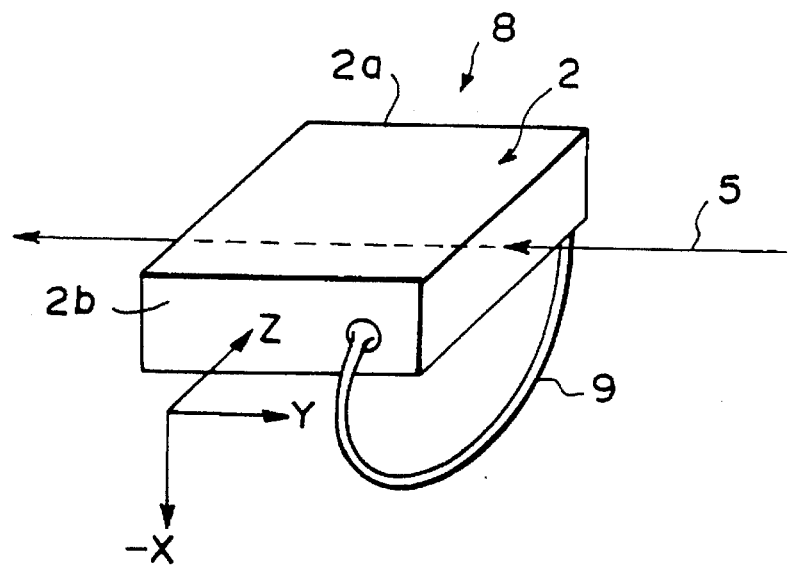
FIG. 3 is a perspective view showing a second embodiment of an optical element according to the present invention.

With reference to FIG. 3, a second embodiment of an optical element according to this invention will now be described. In FIG. 3, the same reference numerals are provided to designate corresponding features in FIG. 1, and the explanation thereof will be omitted here for brevity (the same will also apply to the following embodiments). An optical element 8 of this second embodiment is also a bulk crystal type optical element. The optical element 8 is made up of the MgO-LN crystal 2, and an electrically conductive wire material 9 which connects the +z surface 2a and the −z surface 2b of the MgO-LN crystals 2 with each other.

In the optical element 8 having such a construction, when the laser beam 5 enters this optical element in the same manner as in the first embodiment, it is ascertained that the optical damage resistant property is evidently improved when compared with the comparative examples.

Third Embodiment

Figure 4:
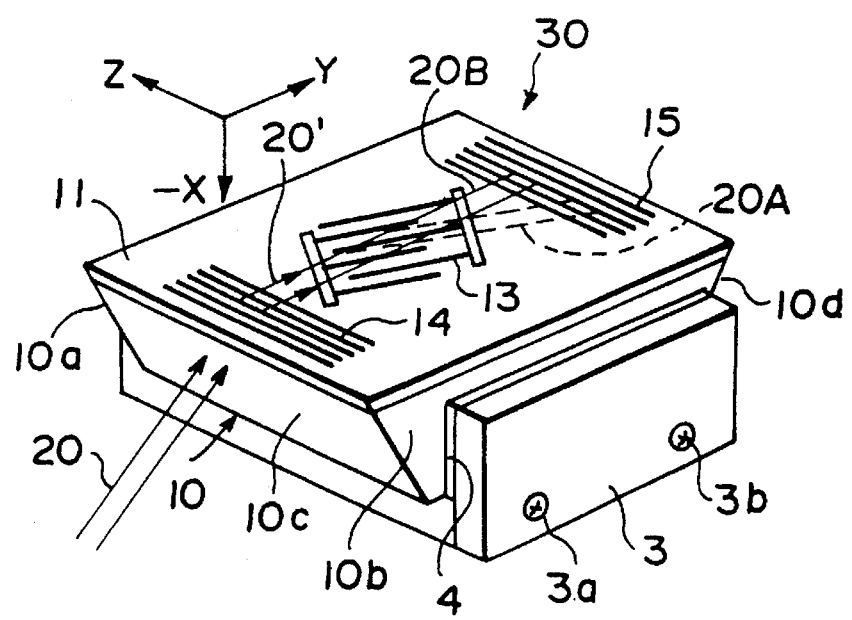
FIG. 4 is a perspective view showing a third embodiment of an optical element according to the present invention.
Figure 5:
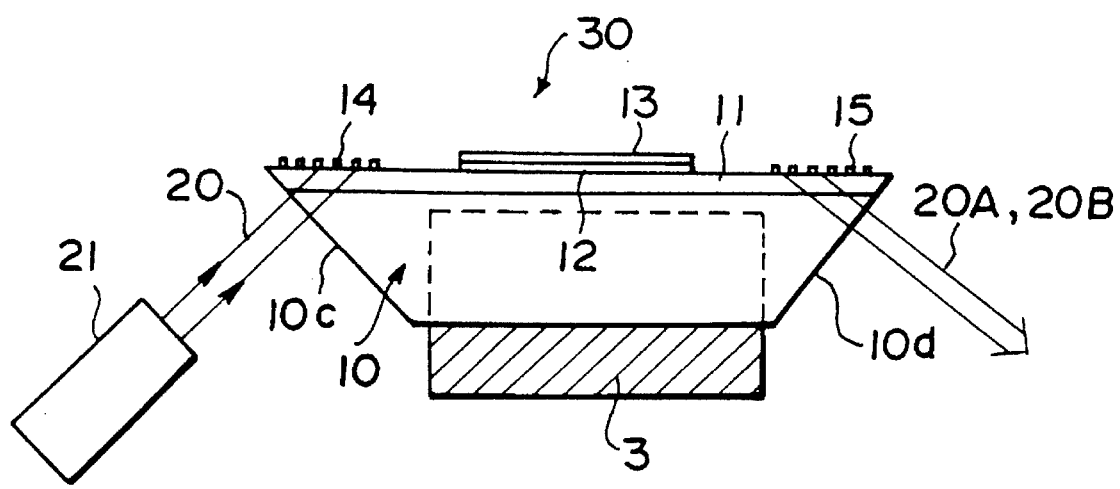
FIG. 5 is a side cross-sectional view of the third embodiment of the optical element according to this invention.

With reference to FIGS. 4 and 5, a third embodiment of an optical element according to this invention will be described. An optical element 30 of the third embodiment is an optical waveguide type. This optical element is made up of a MgO-LN crystal substrate 10, on the surface of which a two-dimensional (thin film) optical waveguide 11 is formed, and the metal jig 3 and the indium sheet 4, which are the same as those used in the first embodiment. Even in this case, the metal jig 3 is arranged in such a way that the +z surface 10a and the −z surface 10b of the MgO-LN crystal substrate 10 are connected to each other via the indium sheet 4.

This optical element 30 constitutes, for example, an electro-optical modulator, and the thin film optical waveguide 11 is formed on the MgO-LN crystal substrate 10 by proton exchange. Linear grating couplers 14 (hereinafter referred to as LGC) for the entrance of light, and LGC 15 for the emission of light, are formed on this optical waveguide 11. An EOG electrode 13, which controls the emission of light from the LGC 15 by switching an optical path of guided light, is arranged between the LGC 14 and the LGC 15 on the optical waveguide 11. This EOG electrode 13 is a grid electrode which forms an electro-optical grating on the optical waveguide 11. The EOG electrode 13 is provided on the optical waveguide 11. The a buffer layer 12 sandwiched between them.

One endface 10c of the substrate 10, which is cut along the x axis, is obliquely polished at a predetermined angle so as to permit the incidence of a laser beam 20 emitted from a laser 21 such as a He-Ne laser, whereas the other endface 10d of the substrate 10 is also polished obliquely at a predetermined angle so as to permit light diffracted from the LGC 15 to be emitted to the outside of the substrate 10.

The laser beam 20, which enters the inside of the substrate 10 through an endface 10c, becomes guided beam 20' after it has been diffracted from the LGC 14 and has entered the optical waveguide 11. This guided beam 20' travels through a part of the waveguide corresponding to the EOG electrode 13. When no voltage is applied to the EOG electrode 13, the guided beam advances straight through the EOG electrode. However, when a predetermined voltage is applied from a non-illustrated driver circuit to the EOG electrode 13, the refractive index of the waveguide 11 having an electro-optical effect is changed, and diffraction gratings are formed. As a result of this, the guided beam 20 is diffracted by the diffraction gratings thus formed. A light beam 20A, thus diffracted, and a non-diffracted light beam 20B are diffracted to the substrate 10 side by the LGC 15, and the beams are emitted to the outside of the optical element from the obliquely cut endface 10d.

When the light beam 20A emitted to the outside of the optical element is, for example, used, it is possible to modulate the light beam 20A in response to the application of the voltage to the EOG electrode 13. When this light beam 20A is modulated on the basis of, for example, a predetermined image signal, the applied voltage is controlled simply on the basis of the image signal.

Even in the optical element 30 of this third embodiment, the +z surface 10a and the −z surface 10b of the MgO-LN crystal substrate 10 are connected to each other by means of the metal jig 3 and the indium sheet 4, and hence the optical damage resistant property of the optical element is improved.

Fourth Embodiment

Figure 6:
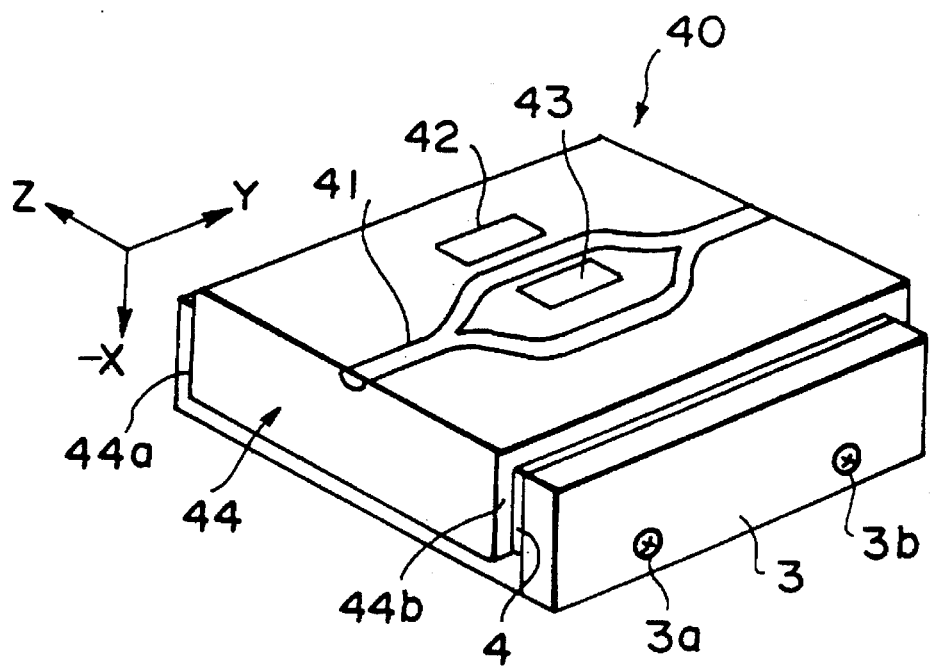
FIG. 6 is a perspective view showing a fourth embodiment of an optical element according to the present invention.

With reference to FIG. 6, a fourth embodiment of an optical element according to the present invention will now be described. An optical element 40 of this fourth embodiment constitutes a bifurcated interference type optical modulator. This optical element 40 is made up of an MgO-LN crystal substrate 44, on the surface of which a three-dimensional optical waveguide 41 and electrodes 42 and 43 for phase modulation are formed, as well as the metal jig 3 and the indium sheet 4, which are the same as those used in the first embodiment. Even in this case, the metal jig 3 is arranged in such a way that a +z surface 44a and a −z surface 44b of the MgO-LN crystal substrate 44 are connected to each other via the indium sheet 4.

Even in this optical element 40 of the fourth embodiment, the +z surface 44a and the −z surface 44b of the MgO-LN crystal substrate 33 are connected to each other by means of the metal jig 3 and the indium sheet 4, whereby the optical damage resistant property of the optical element is improved.

The embodiments applied to the optical elements consisting of an MgO-LN crystal have been described. However, the present invention is applicable to an LT crystal doped with MgO, and is also applicable to an optical element consisting of an LN or LT crystal doped with ZnO. Even in the latter case, similar effects will be obtained.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will without departing from the spirit and scope of the invention, be apparent to those who are versed in the art.

What is claimed is:

1. An optical element comprising:
   a single LN or LT crystal doped with MgO or ZnO on which light is incident, wherein a +z surface and a −z surface of said crystal are connected to each other by an electrically conductive material.

2. An optical element as defined in claim 1, wherein the optical element is a bulk crystal type optical element.

3. An optical element as defined in claim 1, wherein the electrically conductive material is the combination of a metal jig and an indium sheet.

4. An optical element as defined in claim 2, wherein the electrically conductive material is the combination of a metal jig and an indium sheet.

5. An optical element as defined in claim 1, wherein the optical element is a conductive wire material.

6. An optical element as defined in claim 1, wherein the optical element is an optical waveguide type electro-optical modulator.

7. An optical element as defined in claim 6, wherein the electrically conductive material is the combination of a metal jig and an indium sheet.

8. An optical element as defined in claim 1, wherein the optical element is a bifurcated interference type optical modulator.

9. An optical element as defined in claim 8, wherein the electrically conductive material is the combination of a metal jig and an indium sheet.

10. An optical element comprising:
    an optical crystal consisting of either $LiNbO_3$ or $LiTaO_3$, said crystal being doped with either MgO or ZnO; and
    an electrically conductive material for providing an electrical connection between opposite surfaces of said crystal in the direction of the z axis of said crystal.

11. A method for reducing optical damage associated with a low powered incident light beam in a doped optical element, said method comprising the steps of:
    providing an optical crystal consisting of either $LiNbO_3$ or $LiTaO_3$, said crystal being doped with either MgO or ZnO; and
    providing an electrical connection between opposite surfaces of said crystal in the direction of the z axis of said crystal.

* * * * *